July 7, 1970     S. S. FOUSE ET AL     3,519,730

MULTI-PHASE BUS DUCT

Filed Aug. 10, 1967     4 Sheets-Sheet 1

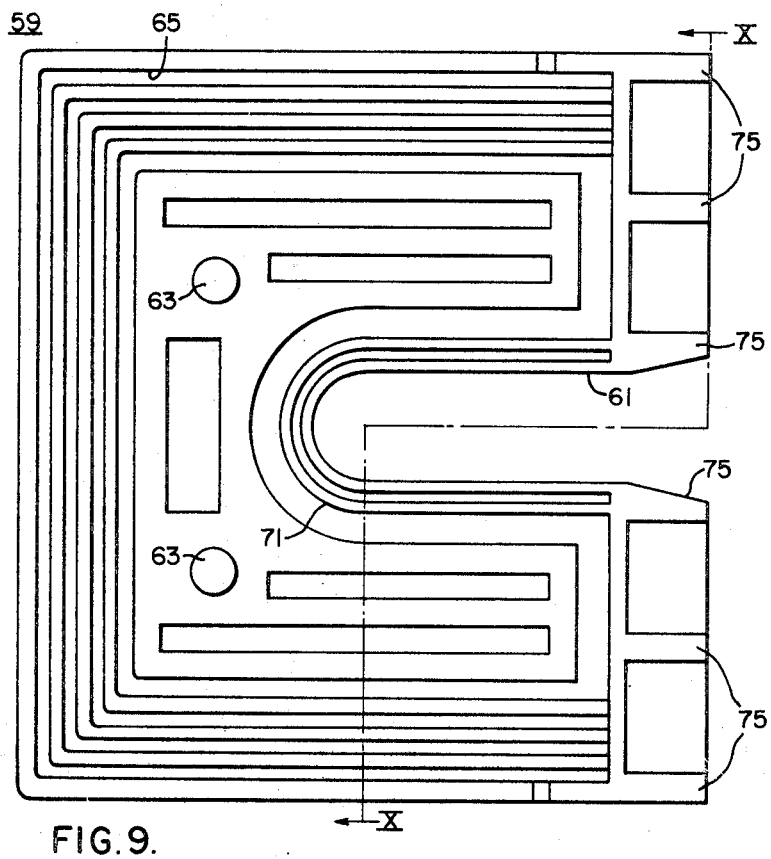
FIG. 9.
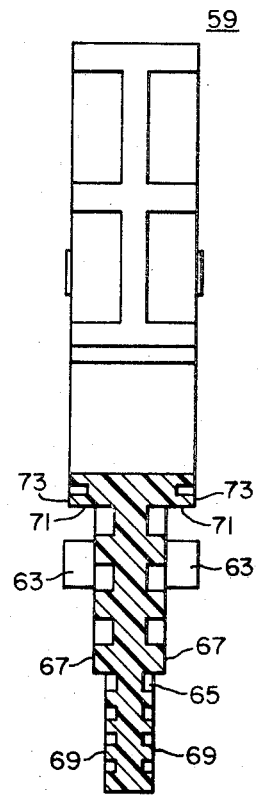
FIG. 10.
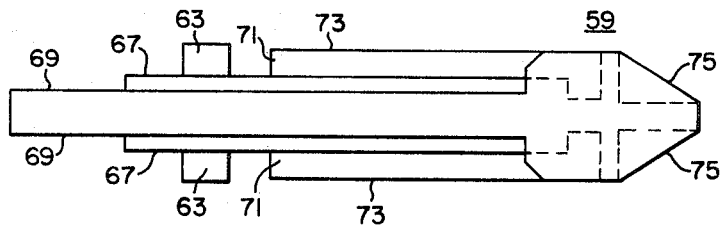
FIG. 8.
FIG. 12.
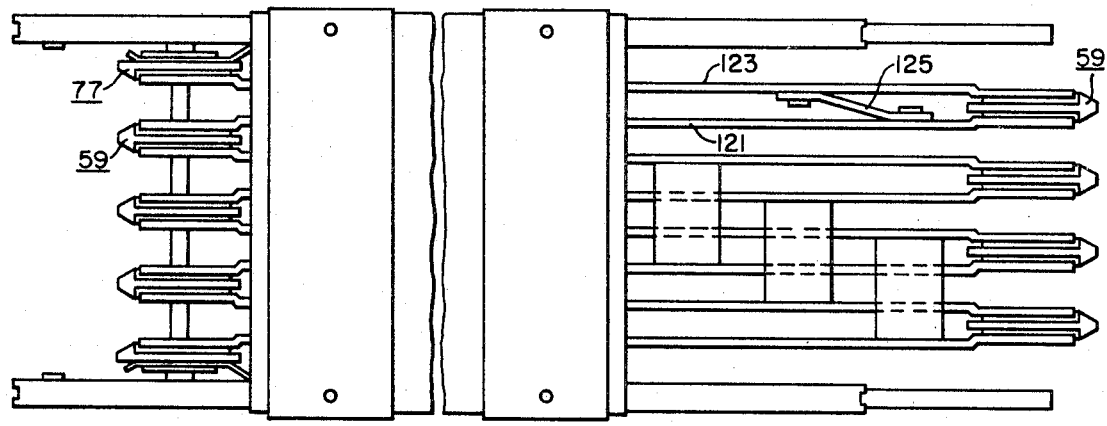

United States Patent Office 3,519,730
Patented July 7, 1970

3,519,730
MULTI-PHASE BUS DUCT
Samuel S. Fouse, Aliquippa, and William W. Hamilton, Jr., Beaver, Pa., assignors to Westinghouse Electric Corporation, Pittsburgh, Pa., a corporation of Pennsylvania
Filed Aug. 10, 1967, Ser. No. 659,646
Int. Cl. H02g 5/06
U.S. Cl. 174—88                                 7 Claims

ABSTRACT OF THE DISCLOSURE

Improved multi-phase bus duct comprises two sections of bus bars with improved means for connecting the sections together. Each section comprises two bus bars per phase with improved means coupling the bus bars of the sections together.

CROSS-REFERENCE TO RELATED APPLICATION

Certain features of the bus duct disclosed in this application are disclosed in the copending application of Samuel S. Fouse, Ser. No. 659,647, filed, Aug. 10, 1967, issued July 29, 1969 as Pat. No. 3,458,647.

BRIEF SUMMARY OF THE INVENTION

Improved multi-phase bus duct comprises two sections of bus duct with each section comprising a plurality of generally flat bus bars supported in a spaced generally parallel face-to-face relationship in a single stack, and with conducting coupling means in each section electrically connecting the bus bars to provide two bus bars per phase. The sections are connected together with each bus bar of one section overlapping a bus bar of the other section and with pressure-connecting means forcing the bus bars and insulating means together into a compact relationship. In one embodiment the pressure-connecting means comprises a single bolt structure that can be tightened and loosened from outside of the bus duct housing. The bus bars and coupling means are constructed to enable effective and relatively easy connection of a plurality of couplers to the bus bars.

OBJECTS OF THE INVENTION

An object of this invention is to provide improved multi-phase bus duct comprising two sections of multi-phase bus bars with each section comprising two coupled bus bars per phase and with improved means for connecting the sections together.

Another object of this invention is to provide improved multi-phase bus duct comprising two coupled bus bars per phase, which bus duct comprises a single-bolt joint structure for connecting the sections of bus duct together.

Another object of this invention is to provide improved multi-phase bus duct comprising two coupled bus bars per phase with the bus bars and coupling means constructed to enable effective and relatively easy connection of couplers to the bus bars.

A more general object of this invention to provide an improved plug-in type of bus duct with improved means for connecting sections of the bus duct together.

BRIEF DESCRIPTION OF THE DRAWINGS

FIG. 8 is a side view of one of the insulating members seen in FIGS. 1 and 5;

FIG. 9 is a top plan view of the insulating member seen in FIG. 8;

FIG. 10 is a sectional view taken generally along the line X—X of FIG. 9;

FIG. 12 is a top view, with parts broken away, of a three-phase full-neutral bus duct section constructed in accordance with principles of this invention.

DETAILED DESCRIPTION

Figure 1:
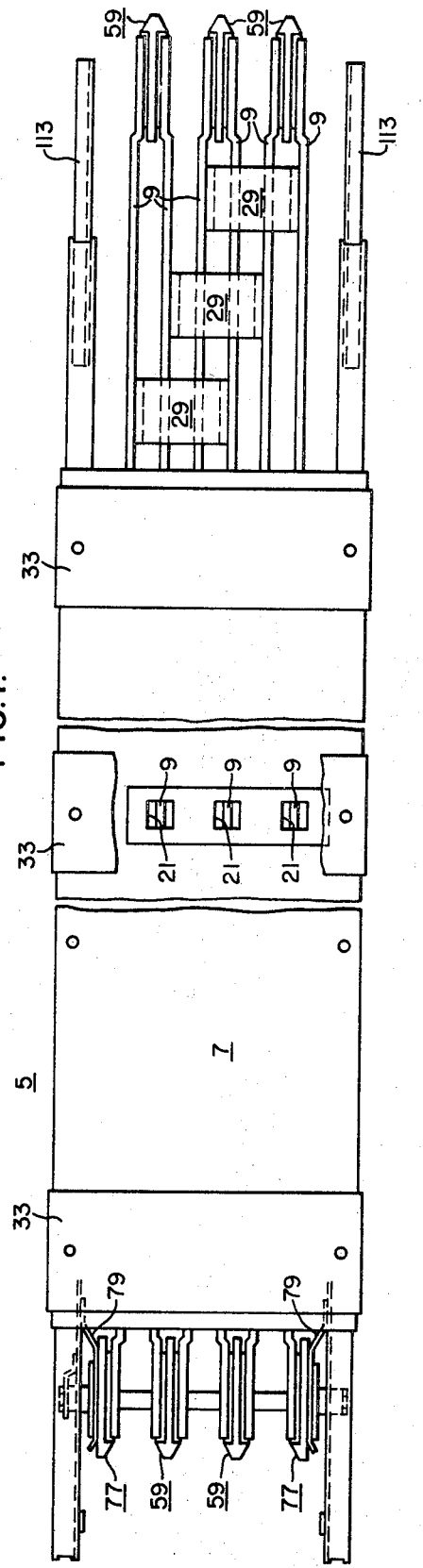
FIG. 1 is a top view, with parts broken away, of a section of bus duct constructed in accordance with principles of this invention.
Figure 2:
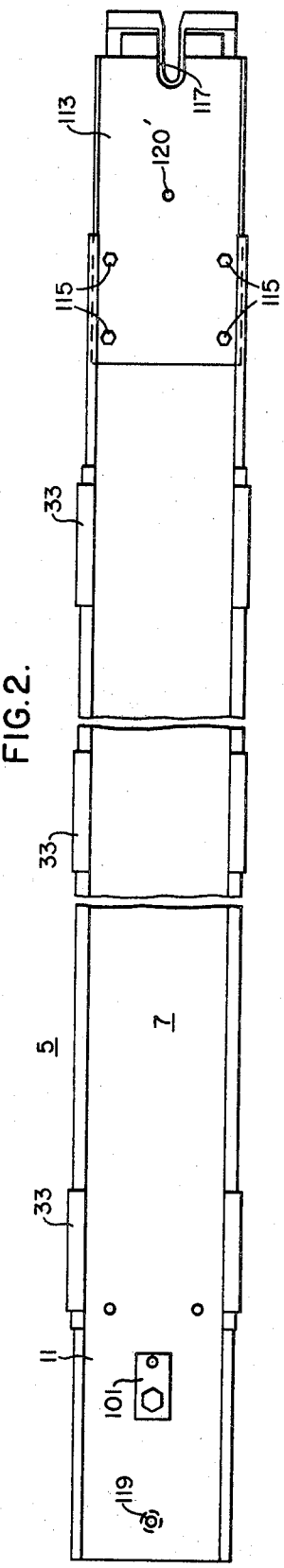
FIG. 2 is a side view of the bus duct section shown in FIG. 1.
Figure 3:
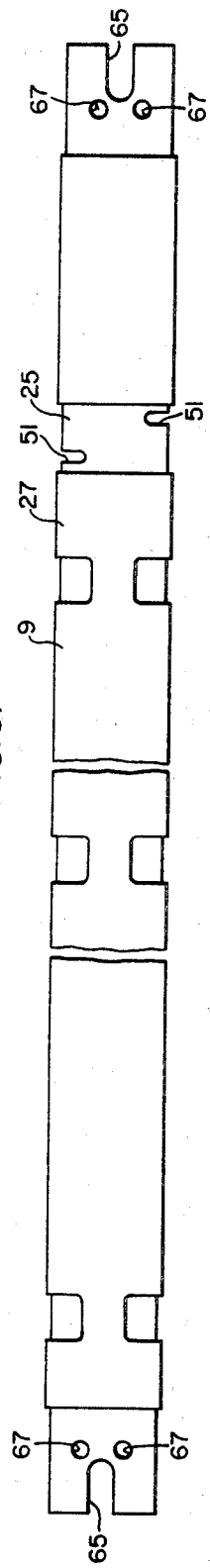
FIG. 3 is a side view of one of the bus bars from the section shown in FIG. 2.
Figure 4:
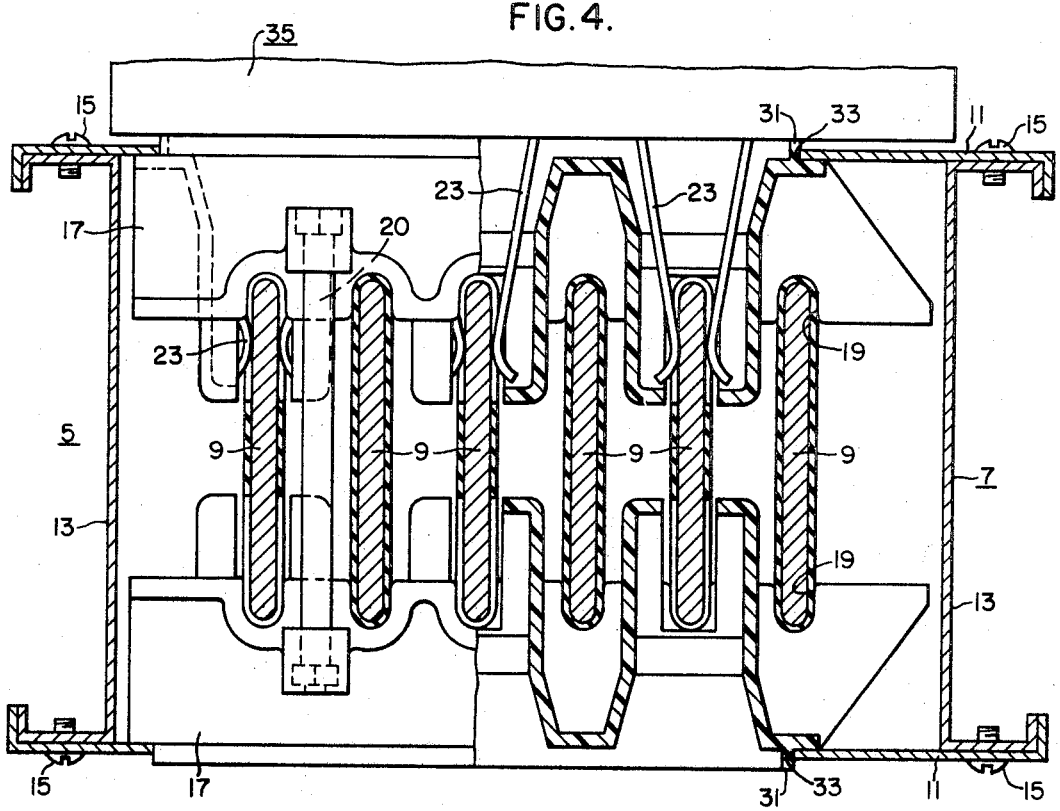
FIG. 4 is a sectional view, with parts broken away, of the section of bus duct seen in FIGS. 1-3 with part of a plug-in unit connected to the section.
Figure 6:
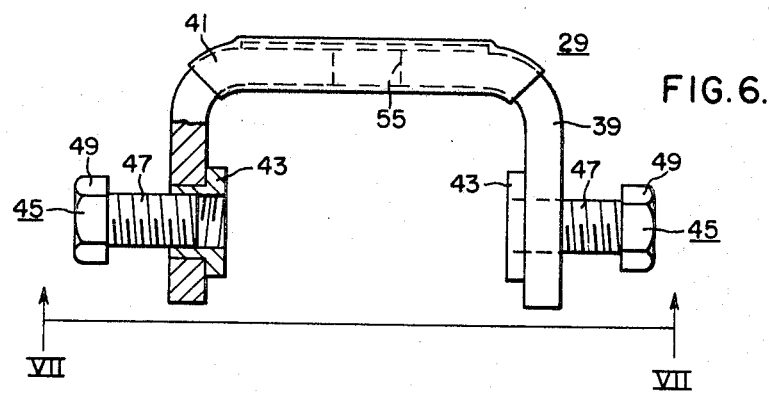
FIG. 6 is an end view, partly in section, of one of the conducting couplers seen in FIG. 5.
Figure 7:
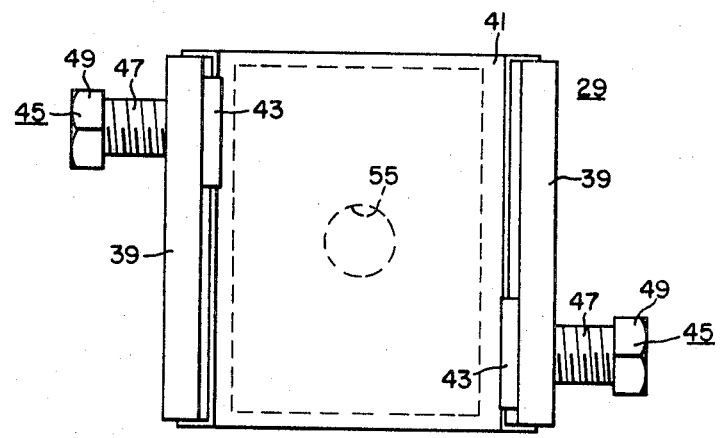
FIG. 7 is a view of the coupler seen in FIG. 6 looking in the direction of the VII—VII arrows.

Referring to the drawings, there is shown, in FIGS. 1, 2 and 4, an elongated section of bus duct 5 comprising an elongated housing 7 and a plurality of elongated flat bus bars 9 supported in the housing 7 in a generally parallel mutually flatwise face-to-face relationship in a single stack. The housing 7 is an elongated tubular (FIG. 4) housing structure comprising a pair of metallic oppositely disposed walls 11 and a pair of metallic oppositely disposed walls 13 which walls 11, 13 are secured together by means of bolts 15 that pass through openings in flange parts of the walls. The bus bars 9 are supported in the housing 7 by means of a plurality of insulating plug-in support members 17 that are positioned at spaced intervals along the length of the housing. As can be seen in FIG. 4, each of the plug-in insulating support members 17 is molded with a plurality of slots 19 therein for receiving the bus bars 9. A plurality of bolts 20 (only one of which is seen in FIG. 4) draw each pair of support members 17 toward each other to capture the bus bars 9 between the support members 17. Each of the support members 17 is formed with a cavity therein and with three openings 21 (FIG. 1) therein for receiving three plug-in connectors 23 (FIG. 4) that extend into the openings 21 for plug-in connection with uninsulated parts of three of the bus bars 9. Each of the bus bars 9 comprises a conducting part 25 (FIG. 3) and an insulating tube 27 thereon which covers the conducting part 25 leaving the opposite ends of the conducting bar 25 exposed for connection to other bus bars and leaving portions along the length thereof exposed for connection to the plug-in members 23 and for connection to a U-shaped coupling member 29 (FIGS. 6 and 7). As can be seen in FIG. 4, each of the plug-in supports 17 is provided with a projecting part 31 that projects through a suitable opening 33 in the associated housing part 11 to close off the associated opening 33. As can be seen in FIGS. 1 and 2, a separate cover member 33 is secured to the housing over each of the plug-in supports 17. When it is desired to mount a plug-in unit 35 (FIG. 4) onto the bus duct, the associated cover 33 (FIG. 1) is removed, and the plug-in unit 35, which comprises plug-in connectors 23 and a suitable circuit interrupter is mounted on the bus duct housing and connected to the bus bars 9 to tap power off of the bus bars. As can be seen in FIG. 4, the plug-in take-off connectors 23 are connected to three of the bus bars 9 and, as will be hereinafter more specifically described, each of the three bus bars 9 is electrically coupled to a separate bus bar 9 to provide two bus bars per phase in a three-phase bus duct system.

Figure 5:
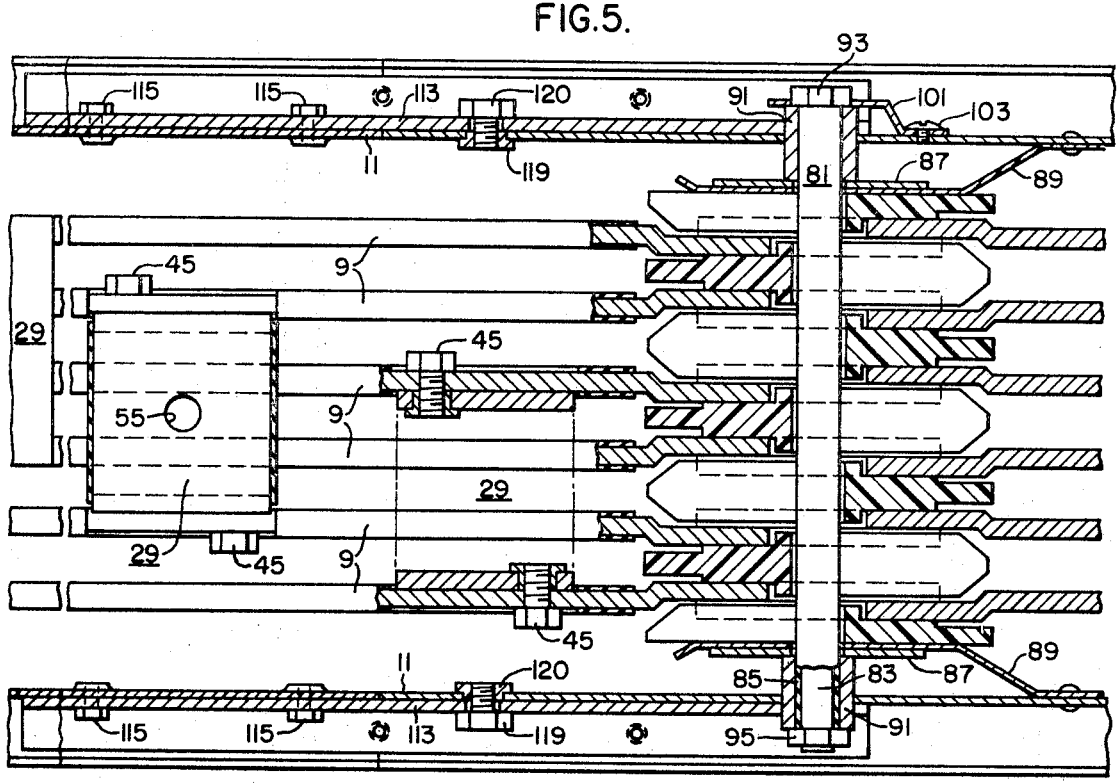
FIG. 5 is a sectional view, with parts broken away, of two of the sections shown in FIGS. 1-3 connected together.

Each of the U-shaped couplers 29 (FIGS. 6 and 7) comprises a U-shaped conductor 39 and an insulating cover 41. A separate tapped insert 43 is secured in an opening in each of the legs of the U-shaped coupler 29, and a separate bolt member 45, comprising a threaded shank 47 and a bolt head 49, is threadedly connected to each of the tapped inserts 43. Each of the bus bars 9 is provided with a pair of slots 51 (FIG. 3) therein open at the opposite sides of the bus bar at an uninsulated portion of the bus bar. With the bus bars supported in the housing 7 in the manner shown in FIG. 1, three couplers 29 are mounted on the bus bars 9 with each coupler 29 electrically connecting two different bus bars to provide two bus bars per phase in the three-phase bus duct section. As can be understood with reference to FIGS. 1 and 5–7, each coupler is mounted in position, with the two bolts 45 secured thereto, by moving the coupler endwise moving the threaded shanks 47 of the bolts 45 into the slots 51 of the two associated bus bars, and thereafter the bolts are tightened drawing the bolt heads 49 inward to draw the bus bars 9 against the associated legs of the U-shaped coupler. Thus, the fastening means or, more particularly, bolt means provides a pressure connection between each U-shaped coupler and the associated coupled bus bars 9. As can be seen in FIG. 1, each of the couplers 29 connects two of the bus bars 9 with the two connected bus bars 9 being separated by two different-phase-conducting bus bars. As can be seen in FIGS. 5 and 6, each of the couplers 29 is provided with an opening 55 in the bight portion thereof so that if it is desired to tap power off of the coupler 29, the insulation can be removed in the area of the opening 55 and a suitable tap-off conductor can be secured to the coupler 29 at the opening 55.

Referring to FIGS. 1, 2 and 8–10, a plurality of rigid molded insulating members 59 are supported on the bus bars 9 at opposite ends of the bus bars. Each of the insulating members 59 (FIGS. 8–10) is molded with an open slot 61 open at one end of the member, and two projections 63 extending from each of two opposite sides of the member. As can be seen in FIGS. 9 and 10, each of the insulating members 59 is provided with a plurality of grooves 65 therein for the purpose of over-the-surface electrical clearance. Each of the bus bars 9 is formed with an open ended slot 65 (FIG. 3) and a pair of openings 67 at each of the two opposite ends thereof. As is best seen in FIGS. 1 and 5, each of the insulating members 59 is supported between two of the bus bars 9 with the slot 61 of the insulating member aligned with the slots 65 of the associated bus bars and with the projections 63 of the insulating member protruding into the openings 67 of the associated bus bars to support the insulating member 59 on the associated two bus bars 9. As can be seen in FIG. 1, the bus bars 9 are bent over at the ends thereof to provide a space between each pair of bus bars for receiving another pair of bus bars and insulating member in the space in a manner to be herein after described. Although each of the insulating members 59 is grooved in the manner seen in FIGS. 9 and 10, it can be understood that there are essentially three levels at each side of the insulator. A first level is shown in FIG. 8 at 67. The associated bus bar rests on the level 67. A lower level is shown at 69 which is provided for electrical clearance between the adjacent bus bars, and a ridge 71 is provided around the slots 61 to provide an upper level 73 (FIG. 8) for electrical clearance between the adjacent bus bars. As can be understood with reference to FIGS. 1 and 8, each of the insulating members 59 is provided with slanted surfaces 75 at each of two opposite sides thereof to provide guiding surfaces for the bus bars and insulators that are moved longitudinally into the mounted position when it is desired to connect two sections of bus duct. Referring to FIG. 1, it will be noticed that in addition to the insulating members 59 there are two insulating members 77 on the left supported adjacent the outer bus bars on the left. The insulating members 77 are constructed similarly to the insulating members 59 except that each of the insulating members 77 is provided with only one side formed for receiving a single bus bar as is shown. An additional bracket 79 is supported on the housing to provide additional support for each of the two outer insulating members 77. As can be understood with reference to FIGS. 1 and 5, a single-bolt structure 81 is supported at one end of the section 5.

The single-bolt structure 81 comprises an elongated metallic bolt member 83 (FIG. 5) and an insulating tube 85 supported over the shank of the bolt 83. A pair of washer members 87 are positioned on the outside of a pair of members 89 that are secured to the housing 7, and a pair of insulating spacers 91 are positioned abutting the washers 87. The bolthead 93 engages the upper insulating spacer 91 and a nut 95, that is threaded on the lower end of the bolt 83, engages the lower insulating spacer 91. The bolt 83 and insulating tube 85 extend through openings in the spacers 91, the washers 87 and the support plates 89, and through the slots in the insulating members 59, 77 and bus bars 9 at the one end (on the left as seen in FIG. 1) of the housing section 7.

When it is desired to connect the bus duct section 5 (FIG. 1) to a similar bus duct section 5, one of the sections is moved longitudinally relative to the other with the bus bars and insulators seen on the right in FIG. 1 extending into the spaced openings between the bus bars and insulators, seen on the left in FIG. 1, of a similar section of bus duct and with the slots 61, 65 of the insulating members 59 and bus bars 9 receiving the bolt 83 and insulating tube 85 of the similar section in the manner shown in FIG. 5. As can be seen in FIG. 5, each bus bar of the one section laps a bus bar of the similar section at the connection. Thereafter, the bolt 83 and nut 95 are moved to a tightened position drawing the insulators 91, washers 87, plates 89, insulating members 59, 77 and bus bars 9 into a compact pressure-connected relationship. As can be seen in FIG. 5, the spacers 85, 91 extend through openings in the housing. Thus, the connection is independent of the housing and the connection can be tightened and loosened from outside of the housing. As can be seen in FIG. 5, a support plate 101 is supported at the top of the bolt structure 81 on the housing 7 by means of a screw 103. The plate 101 is provided with a hexagonal opening for receiving the hexagonal bolt head 93 to prevent rotation of the bolt head 93 while the nut 95 is being tightened. The single-bolt joint is readily disconnected by loosening the nut 95, to relieve the pressure between the compacted members, whereupon one of the sections can be pulled away from the other section. It can be understood that the member 101 could be mounted on the opposite housing wall to key with the nut 95 so that the connection could be tightened and loosened by rotating the bolt head 93.

As can be seen in FIG. 1, there are two groups of insulating members supported on the bus duct section. One of the groups is shown on the right comprising three of the members 59 supported on three different pairs of bus bars 9 with each pair of bus bars 9 comprising two bus bars from two different phases. The other group of insulating members on the left comprises two of the insulating members 59 for receiving two pairs of bus bars of different phases, and the two outer insulating members 77 which are adjacent the two outer bus bars 9 that conduct different phases.

As can be understood with reference to FIGS. 1 and 5, each bus duct section comprises two bus bars per phase which two bus bars are coupled by means of the associated coupler 29. Each couple comprises two bus bars that are separated by two other bus bars of the two other couples. The insulating members 59 and 77 are supported at the opposite ends of the bus duct section with the insulating members 77 being positioned on the outside of a different one of the outer of the six bus bars and with each of the insulating members 59 being supported between two bus bars of opposite phases. The bus bars and insulators are spaced at the opposite ends to enable connection of the bus duct section with a similar bus duct section by merely moving the sections together and tightening the single-bolt structure 81 in the manner hereinbefore described.

As can be seen in FIG. 3, the slots 51 that are on opposite sides of the bus bar 9 are spaced lengthwise because if they were opposite each other the cross-sectional area of the bus bar between the slots would be reduced to an undesirable small cross section.

As can be understood with reference to FIGS. 1, 2 and 5, the bus duct housing 7 is provided with a plate 113 at one end of the bus duct on each of two opposite sides of the bus duct. Each of the plates 113 is secured to the associated wall 11 by means of four bolts 115 and the plate 113 is provided with a slot 117 that aligns with the slots in the bus bars and insulators at the associated end of the bus duct section. A tapped insert 119 is supported at the other end of the bus duct housing. As can be seen in FIG. 5, when the sections are moved into the connected position the plate 113 of the one section laps part of the wall 11 of the other section and a bolt 120 is passed through an opening 120' in the plate 113 and threaded into the tapped insert 119 to secure the housing parts together. At the connection between the wall parts 113, 11 additional support is provided in that the slot 117 receives the associated insulating spacer member 91 (FIG. 5) in the manner shown in FIG. 5. As can be understood with reference to FIG. 1, when the sections are brought together into the connected position shown in FIG. 5 the upper and lower walls are closed by means of the lapping plates 113, 11 and the other opposite walls of the housing at the connection are open. When the sections are connected, separate side-plates (not shown) are mounted on the housing at the opposite sides of the housing at the connection in order to close off the side openings in a well known manner.

Figure 11:
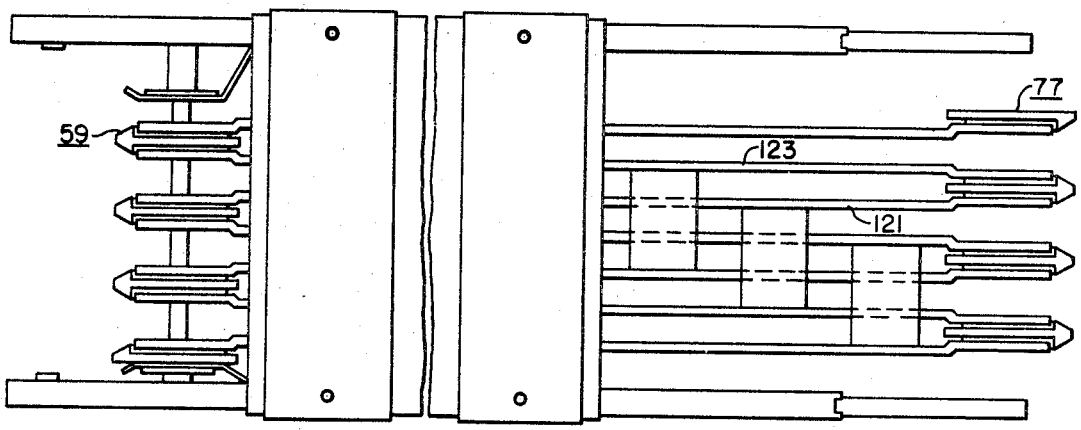
FIG. 11 is a top view, with parts broken away, of a three-phase half-neutral bus duct section constructed in accordance with principles of this invention.

Referring to FIG. 11, there is shown therein a bus duct section that is similar to the bus duct section hereinbefore described with regard to FIGS. 1–10 except that an additional bus bar 121 is added to the section in order to provide a three-phase half-neutral system. In this case, one of the insulating members 59 is used as the top insulating member on the left-hand side of the section and one of the insulating members 77 is used as the top insulating member on the right-hand side of the section. It will be readily understood that the six bus bars and coupling members shown in FIG. 11, for carrying the three phases, are identical to those previously described and that the neutral bus bar 121 is added to provide a three-phase half-neutral bus duct system.

Referring to FIG. 12, a bus duct section shown therein comprises the six bus bars for conducting three phases, a neutral bus bar 121 similar to the bar 121 shown in FIG. 11 and another neutral bus bar 123 supported above the neutral bus bar 121 and electrically connected to the bus bar 121 by means of a conducting strip 125. In this case, one of the insulating members 77 is provided as the top insulating member on the left-hand side of the section and one of the insulating members 59 is provided as the top insulating member on the right-hand side of the section. The bus duct section shown in FIG. 12 is constructed in the same manner as that hereinbefore described with reference to FIGS. 1–11 except that the two bus bars 121, 123 are provided and connected together in order to provide a three-phase full-neutral bus duct system. It will be readily understood that each of the bus duct sections disclosed in FIGS. 11 and 12 can be readily connected to a similar bus duct section in the same general manner as was hereinbefore described with reference to the connection shown in FIG. 5.

We claim as our invention:

1. A section of bus duct comprising an elongated housing, a plurality of generally flat elongated bus bars supported in said housing in a spaced generally parallel face-to-face relationship, each of two of said bus bars having a slot therein open at the side of the bus bar, a generally U-shaped conducting coupling member having a threaded bolt-receiving opening in each of the two opposite legs thereof, a separate bolt for each of said two opposite legs, each of said bolts comprising a bolt head and a threaded shank, each of said bolts being supported on the associated leg with the associated threaded shank in threaded engagement in the associated threaded bolt-receiving opening, said coupling member being supported on said two bus bars with each of said legs being adjacent a different one of said bus bars and with each of said threaded shanks being in the open slot of the associated bus bar and with each bolt being tightened to draw the associated leg and the associated bus bar together whereby said coupling member is connected to the two associated bus bars to electrically connect the two associated bus bars.

2. A section of bus duct according to claim 1, each of said legs of said coupling member being on the side of the associated bus bar that is closest to the other of said two bus bars, and each of said bolt heads being drawn toward the other side of the associated bus bar to draw the associated leg and the associated bus bar together.

3. A section of bus duct according to claim 2, at least six of said bus bars being supported in said housing in a single stack, three of said coupling members connecting said six bus bars in three separate couples, each of said three coupling members being supported on and electrically connecting two different bus bars that are separated by two other bus bars from the two other couples.

4. Multi-phase bus duct comprising two elongated multi-phase bus duct sections, each of said sections comprising an elongated housing and at least six elongated generally flat bus bars supported in the housing in a spaced generally parallel face-to-face relationship in a single stack, each of said sections comprising at least three separate conducting coupling members with each coupling member electrically connecting a separate couple of bus bars in the associated section to provide at least three couples of bus bars and with each of said couples comprising two different non-adjacent bus bars, each of said coupling members being a generally U-shaped member, fastening means fastening the opposite legs of each of said coupling members to the associated coupled bus bars, connecting means connecting said sections together with each bus bar of a first of said sections in a lapped relationship with a different bus bar of the second of said sections whereby said six bus bars of said first section and said six bus bars of said second section are connected as six separate pairs of lapped bus bars with the bus bars of each of said couples in said first of said sections being connected to the bus bars of a separate of said couples in the second of said sections, insulating means at said connection between adjacent pairs of lapped bus bars, said connecting means comprising pressure-connecting means forcing said bus bars and insulating means together in a compact relationship at said connection, each of said bus bars having a slot therein open at the side of the bus bar, each of said coupling members comprising a U-shaped coupling member having a threaded bolt-receiving opening in each of the two opposite legs thereof, a separate bolt for each of said two opposite legs of each of said coupling members, each of said bolts comprising a bolt head and a threaded shank, each of said bolts being supported on the associated leg with the associated threaded shank in threaded engagement in the associated threaded bolt-receiving opening, each of said coupling members being supported on two bus bars that are spaced by two other bus bars of said stack with each of the legs of the coupling member being adjacent a different one of the two associated bus bars and with each of the threaded shanks of the associated bolt being in the open slot of the associated bus bar and with each bolt being tightened to draw the associated leg and the associated bus bar together whereby each of said coupling members is connected to the associated two bus bars to electrically connect the associated two bus bars.

5. Multi-phase bus duct comprising two elongated multi-phase bus duct sections, each of said sections comprising an elongated housing and at least six elongated generally flat bus bars supported in the housing in a spaced generally parallel face-to-face relationship in a single stack, each of said sections comprising at least three separate conducting coupling members with each coupling member electrically connecting a separate couple of bus bars in the associated section to provide at least three couples of bus bars and with each of said couples comprising two different non-adjacent bus bars, each of said coupling members being a generally U-shaped member, fastening means fastening the opposite legs of each of said coupling members to the associated coupled bus bars, connecting means connecting said sections together with each bus bar of a first of said sections in a lapped relationship with a different bus bar of the second of said sections whereby said six bus bars of said first section and said six bus bars of said second section are connected as six separate pairs of lapped bus bars with the bus bars of each of said couples in said first of said sections being connected to the bus bars of a separate of said couples in the second of said sections, insulating means at said connection comprising a separate rigid insulating member between each separated adjacent pairs of lapped bus bars, said connecting means comprising pressure-connecting means forcing said bus bars and insulating means together in a compact relationship at said section, said insulating means at said connection comprising a first group of rigid insulating members supported on said first section and a second group of rigid insulating members supported on said second section, the bus bars and the first group of insulating members of said first section having aligned open slots therein at said connection, the bus bars and the second group of insulating members of said second section having aligned opening means therein, said pressure-connecting means comprising a single bolt member, said single bolt member passing through said aligned opening means in said bus bars and said second group of insulating members of said second section and through said aligned slots in said bus bars and said first group of insulating members of said first section, said single bolt member being supported on said second section whereby when said pressure-connecting means is loosened said second section can be pulled away from said first section with said bolt member moving out through the aligned slot in said bus bars and first group of insulating members of said first section.

6. Multi-phase bus duct comprising two elongated multi-phase bus duct sections, each of said sections comprising an elongated housing and at least six elongated generally flat bus bars supported in the housing in a spaced generally parallel face-to-face relationship in a single stack, each of said sections comprising at least three separate conducting coupling members with each coupling member electrically connecting a separate couple of bus bars in the associated section to provide at least three couples of bus bars and with each of said couples comprising two different non-adjacent bus bars, each of said coupling members being a generally U-shaped member, bolt means bolting the opposite legs of each of said coupling members to the associated coupled bus bars, connecting means connecting said sections together with each bus bar of a first of said sections in a lapped relationship with a different bus bar of the second of said sections whereby said six bus bars of said first section and said six bus bars of said second section are connected as six separate pairs of lapped bus bars with the bus bars of each of said couples in said first of said sections being connected to the bus bars of a separate of said couples in the second of said sections, insulating means at said connection between adjacent pairs of lapped bus bars, and said connecting means comprising pressure-connecting means forcing said bus bars and insulating means together in a compact relationship at said connection.

7. Multi-phase bus duct according to claim 6, each of said generally U-shaped coupling members having a threaded bolt-receiving opening in each of the two opposite legs thereof, said bolt means comprising a separate bolt for each of the two opposite legs of each of said coupling members, each of said bolts comprising a bolt head and a threaded shank, each of said bolts being supported on the associated leg with the associated threaded shank in threaded engagement in the associated threaded bolt-receiving opening, each of said coupling members being supported on the associated two bus bars with each of the legs thereof being adjacent a different one of the associated two bus bars and with each of the threaded shanks being in the open slot of the associated bus bar and with each bolt being tightened to draw the associated leg and the associated bus bar together whereby each conducting coupling member is connected to the associated two bus bars to electrically connect the associated two bus bars.

References Cited

UNITED STATES PATENTS

| | | | |
|---|---|---|---|
| 2,287,502 | 6/1942 | Togesen et al. | 307—147 |
| 2,942,225 | 6/1960 | Ricci et al. | |
| 2,997,523 | 8/1961 | Weimer et al. | |
| 3,009,011 | 11/1961 | Fisher. | |
| 3,183,298 | 5/1965 | Weimer et al. | |

DARRELL L. CLAY, Primary Examiner

U.S. Cl. X.R.

174—99; 339—22